United States Patent [19]

Holtz

[11] Patent Number: 4,470,483
[45] Date of Patent: Sep. 11, 1984

[54] BICYCLE BRAKE

[76] Inventor: Leonard J. Holtz, 9474 Wayside Dr., Sunland, Calif. 91041

[21] Appl. No.: 338,371

[22] Filed: Jan. 11, 1982

[51] Int. Cl.³ .............................................. B62L 1/12
[52] U.S. Cl. ............................. 188/24.11; 188/24.12; 188/73.1; 188/250 B; 74/816
[58] Field of Search ............. 188/24.11, 24.12, 24.16, 188/24.19, 24.21, 24.22, 251 R, 251 M, 251 A; 74/816

[56] References Cited

U.S. PATENT DOCUMENTS 2,862,408 12/1958 Stirrett .............................. 74/8 B X
3,791,493 2/1974 Yamaguchi et al. ........... 188/251 M
3,835,963 9/1974 Ohtari ......................... 188/24.12 X

FOREIGN PATENT DOCUMENTS 485144 10/1928 Fed. Rep. of Germany ...... 188/234
14705 of 1903 United Kingdom ............. 188/24.21

Primary Examiner—George E. A. Halvosa
Attorney, Agent, or Firm—Jack C. Munro

[57] ABSTRACT

A braking pad device for a bicycle which includes two separate braking pads of different compositions. One braking pad is particularly suitable for use in dry weather, while the second braking pad is particularly suitable for use in wet weather. The braking pads are to be movable to be located in position for use.

5 Claims, 6 Drawing Figures

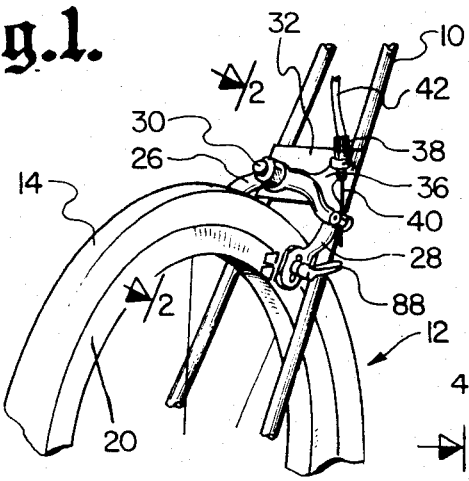
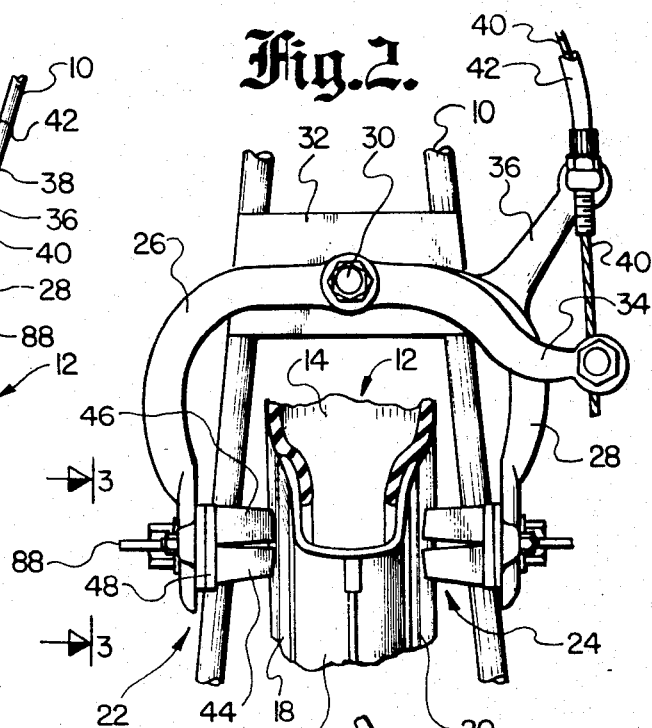
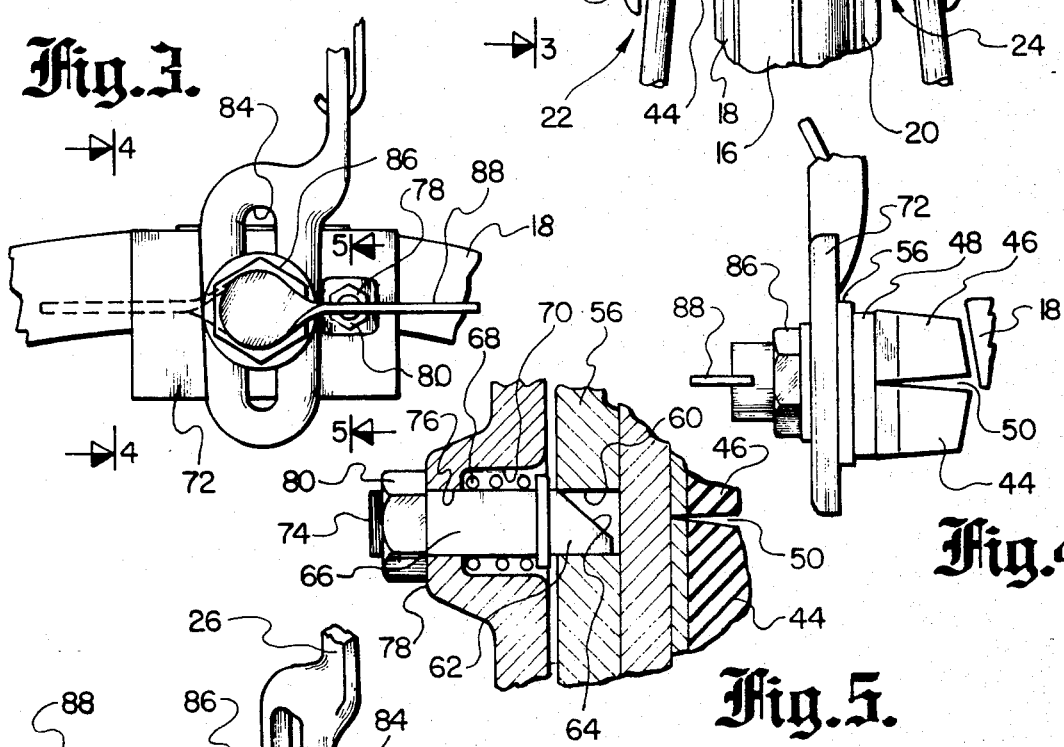
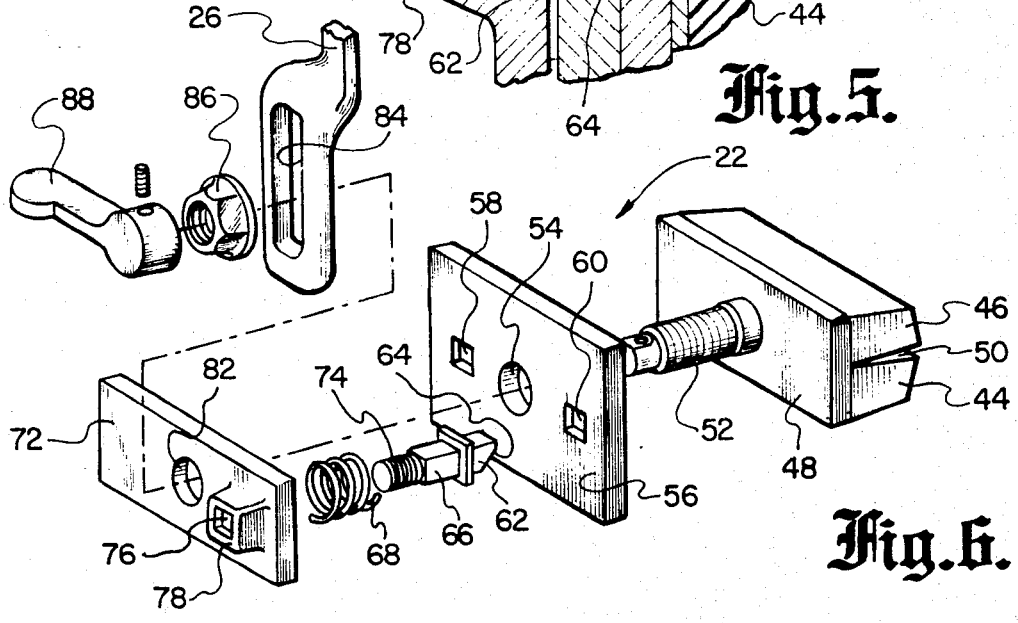

BICYCLE BRAKE

BACKGROUND OF THE INVENTION

The field of this invention relates to bicycles and more particularly to a braking device for a bicycle which has been constructed for use during both wet and dry weather.

The use of a pivotally operated arm assembly in conjunction with a bicycle for the moving of a brake pad in contact with the wheel of a bicycle is well known. This constitutes the total braking mechanism for a bicycle to decrease the speed of the bicycle. This braking device is manually operated.

In the past, such braking devices have been designed in particular for use in dry weather. During wet weather conditions, the braking pad, not being designed in particular for use in wet weather, has a tendency to slip thereby not comprising the most efficient braking structure.

The braking of a bicycle is an extremely necessary feature. Braking mechanisms which apply a brake pad against the wheel rim must operate efficiently in order to operate satisfactorily. The reason for this is that there is a substantially small amount of braking surface. Inefficient braking, such as during wet weather, can be extremely hazardous.

It would be desirable to design a bicycle brake wherein different brake pads can be readily positioned for use during different weather conditions.

SUMMARY OF THE INVENTION

A braking apparatus for a bicycle wherein the braking force is applied to the wheel rim of a bicycle. The braking device takes the form of a support arm assembly (caliper type) which is attached to the frame of a bicycle. The support arm assembly has a free outer end upon which is mounted the braking pad assembly. The support arm assembly is pivotally movable in respect to the frame so that the braking pad assembly can either be in contact with the wheel rim or be spaced therefrom. The braking pad assembly is composed of two separate braking pads which are constructed of different compositions. A typical composition would be a rubber. The brake pad which is to be particularly suited for wet weather conditions would normally include an increased amount of a granulated abrasive within the brake pad which causes the brake pad to operate more effectively when in contact with a wet wheel rim. The braking assembly is to be manually pivoted with respect to the support arm assembly so that either the dry brake pad is to contact the wheel rim or the wet brake pad is to contact the wheel rim. A detent in the form of a spring biased locking pin is to engage with an opening to lock the brake pad assembly in position when the brake pad is in either position. The outermost end of the locking pin includes a cam surface. During manual turning of the brake pad assembly, the cam surface causes the locking pin to be automatically retracted permitting the turning movement of the brake pad assembly to occur.

The primary objective of this invention is to construct a caliper type of braking system for a bicycle which can optionally provide different types of brake pads to be utilized in the braking of the bicycle depending upon weather conditions.

BRIEF DESCRIPTION OF THE DRAWINGS

FIG. 1 is an overall, isometric view of the braking assembly of this invention shown mounted in conjunction with a wheel of a bicycle;

FIG. 2 is a cross-sectional view through the wheel of a bicycle showing the braking assembly in a front view taken along line 2—2 of FIG 1;

FIG. 3 is a back view of the braking pad assembly utilized in conjunction with a caliper type of braking assembly of this invention taken along line 3—3 of FIG. 2;

FIG. 4 is a right side view of the braking pad assembly taken along line 4—4 of FIG. 3;

FIG. 5 is a cross-sectional view through the detent mechanism associated with the braking pad assembly of this invention taken along line 5—5 of FIG. 3 showing the detent mechanism in the fully locked position; and FIG. 6 is an expoded diametric view of the braking pad assembly which is included in the braking device of this invention.

DETAILED DESCRIPTION OF THE SHOWN EMBODIMENT

Referring particularly to the drawing, there is shown a portion of a conventional bicycle frame 10 which supports a bicycle wheel 12. The bicycle wheel 12 is composed of an inflatable tire 14 which is mounted on a tire rim 16. The tire rim 16 has side flanges 18 and 20. The brake pad assembly 22 is to contact side flange 18. The brake pad assembly 24 is to contact side flange 20.

The brake pad assembly 22 is mounted on the free outer end of a support arm 26. Similarly, the brake pad assembly 24 is mounted on the free outer end of the support arm 28. The support arms 26 and 28 are connected together by a pivot pin 30. Pivot pin 30 is mounted on cross member 32 which is formed as part of the frame 10.

The support arm 26 includes an extension 34. The outer free end of extension 34 is to be capable of coming into contact with the back side of the brake pad assembly 24. This extension 34 functions to define the outer limit of movement separating the brake pad assembly 24 from the brake pad assembly 22. There is a spring 35 (shown only partially) connected between the arms 26 and 28. This spring 35 exerts a continuous bias tending to separate the braking pad assemblies 22 and 24.

The arm 28 includes an extension 36. Threadably secured to the outer end of the extension 36 is a bolt fastener 38. Bolt fastener 38 includes a through opening (not shown) through which is conducted a wire 40. A sheath 42 surrounds the wire 40. The sheath 42 is fixed in position to the head of the bolt fastener 38. The wire rod 40 connects to the free outer end of the extension 34.

A pulling motion on the wire 40 produces relative motion between the wire 40 and the sheath 42. This causes the extensions 34 and 36 to be pivoted toward each other, which in turn causes the brake assemblies 22 and 24 to be pressed against their respective wheel rims 18 and 20. Equal braking force is therefore applied to each of the wheel rims 18 and 20.

Each of the braking pad assemblies 22 and 24 are identical in configuration. The following description is directed to braking pad assembly 22. However, it is to be understood that this description could similarly apply to braking pad assembly 24.

The braking pad assembly 22 includes a first braking pad 44 and a second braking pad 46. Both the braking pad 44 and 46 are fixedly mounted onto a backing plate 48. The braking pads 44 and 46 are separated from each other by means of a gap 50. Each of the braking pads 44 and 46 are constructed of a slightly different composition. Normally, both compositions will contain rubber. The composition of the pad 46 is specially suited to function optimumly during dry weather conditions. Pad 44 is adapted to function optimumly during wet weather conditions.

Extending from the backing plate 48 is a threaded fastener 52. The threaded fastener 52 extends through a hole 54 formed within a mounting plate 56. Also formed within the mounting plate 56 are a pair of openings 58 and 60. The openings 58 and 60 are diametrically opposed relative to each other in respect to the opening 54. It is also to be noted that the openings 58 and 60 are equidistantly spaced from the opening 54. The mounting plate 56 is to be fixedly secured to the backing plate 48.

A locking pawl 62 is to be capable of connecting with either opening 58 or opening 60. The locking pawl 62 has an inclined cam surface 64. The main body section 66 of the latching pawl 62 is polygonal shaped. Located about the main body section is a coil spring 68. The coil spring, as well as the main body section 66, fits within a recess 70 formed within a cover plate 72. Secured to the main body portion 66 is a threaded rod 74. The threaded rod 74 after passing through the recess 70 extends through hole 76 formed within raised section 78. The raised section 78 is integrally formed with the cover plate 72. A nut 80 connects with the threaded section 74 thereby securing the locking pawl in position to the cover plate 72.

The rod 52, after extending through the opening 54, extends through a similar opening 82 of the cover plate 72. The rod then passes through slot 84 formed within the support arm 26. A nut 86 is secured to the threaded rod 52 and holds, in a close fitting relationship, the mounting plate 56 to the cover plate 72. However, rotational movement between the plates 56 and 72 is permitted. In order to obtain this rotational movement, a handle 88 is mounted onto the outer end of the rod 52. Manual turning of the handle 88 will result in either pad 46 or pad 44 being located directly adjacent the wheel rim 18.

Because of the inclined cam surface 64, it is to be noted that the handle 88 can only be turned in one direction. During the turning of the handle 88, the cam surface 64 is moved out of the of the opening 58 or 60 within which it is located and then rides across the surface of the mounting plate 56 until it comes to rest within the other of the openings 58 or 60. It is to be noted that the direction of turning of the brake pad assembly 22 is opposite that of brake pad assembly 24. Manual turning direction of each pad assembly is opposite to the direction of the wheel rotation (when moving forward). Otherwise, there will be a tendency for the wheel rotation to turn the brake pad assemblies 22 and 24.

To know what position the brake pad assemblies are in, the opposite surfaces of the handle 88 may be color coded, such as one surface being blue (to denote the wet pad 44) and the opposite surface being orange (to denote the dry pad 46). Other identifying indicia could be utilized.

What is claimed is:

1. In combination with a bicycle, said bicycle having a frame, a wheel rotatably mounted on said frame, a caliper braking device mounted on said frame, said braking device comprising:

a support arm assembly mounted on said frame, said support arm assembly being pivotable between a first position and a second position;

a manual actuator assembly connected to said support arm assembly, said manual acutator assembly capable of being manually actuated to move said support arm assembly between said first and second positions;

a braking pad assembly mounted on said support arm assembly, said braking pad assembly being in contact with said wheel when said support arm assembly is in said first position, said braking pad assembly being spaced from said wheel when said support arm assembly is in said second position; and said braking pad assembly being movable relative to said support arm assembly between a first braking position and a second braking position, said braking pad assembly comprising a first braking pad and a second braking pad, said first braking pad being constructed of a different composition than said second braking pad, said first braking pad only able to be in contact with said wheel when said support arm assembly is in said first position and said brake pad assembly is in said first braking position, said second braking pad only able to be in contact with said wheel when said support arm assembly is in said first position and said brake pad assembly is in said second braking position so as to provide reliable braking in either dry or wet weather by selection of said first and second braking pads.

2. The combination as defined in claim 1 wherein: said braking pad assembly being mounted on a shaft, said shaft being pivotally mounted upon said support arm assembly.

3. The combination as defined in claim 2 wherein: detent means is mounted upon said braking pad assembly, said detent means locking said braking pad assembly when located in either said first braking position or said second braking position.

4. The combination as defined in claim 3 wherein: said detent means includes an axially movable rod, said first and second braking pads being secured to a mounting plate, a pair of openings formed within said mounting plate, said axially movable rod having a free outer end, said free outer end being connectable with a selected one of said pair of openings to thereby lock said braking pad assembly.

5. The combination as defined in claim 4 wherein: said free outer end includes a cam surface, said cam surface causes automatic withdrawal of said axially movable rod from said pair of openings during movement of said braking assembly between said first braking position and said second braking position.

* * * * *